(12) United States Patent
Norman et al.

(10) Patent No.: US 8,439,220 B2
(45) Date of Patent: May 14, 2013

(54) CROSS FLANGE SEAL FOR A PRESSURE VESSEL, ESPECIALLY FOR A TURBOMACHINE CASING

(75) Inventors: Darran-Lee Norman, Horsham (GB); Mladen Matan, Karlovac (HR)

(73) Assignee: ALSTOM Technology Ltd, Baden (CH)

( * ) Notice: Subject to any disclaimer, the term of this patent is extended or adjusted under 35 U.S.C. 154(b) by 1141 days.

(21) Appl. No.: 11/822,848

(22) Filed: Jul. 10, 2007

(65) Prior Publication Data
US 2008/0012241 A1    Jan. 17, 2008

(30) Foreign Application Priority Data

Jul. 11, 2006  (CH) ..................................... 1103/06

(51) Int. Cl.
*B65D 53/06* (2006.01)
*B65D 51/16* (2006.01)

(52) U.S. Cl.
USPC ..................... 220/367.1; 220/228; 411/82.1

(58) Field of Classification Search .................. 220/367, 220/228, 239, 327; 277/616; 138/89, 90; 411/44, 82.1, 930
See application file for complete search history.

(56) References Cited

U.S. PATENT DOCUMENTS

| | | | |
|---|---|---|---|
| 2,677,149 A | | 5/1954 | Fineran |
| 3,240,379 A | | 3/1966 | Bremer et al. |
| 3,434,743 A | * | 3/1969 | Boeker ............................ 285/39 |
| 3,726,319 A | * | 4/1973 | Patterson ......................... 138/90 |
| 3,861,646 A | * | 1/1975 | Douglas .......................... 251/356 |
| 4,044,798 A | | 8/1977 | Feldstein et al. |
| 4,165,080 A | | 8/1979 | Adams |
| 5,076,311 A | * | 12/1991 | Marschke ................... 137/15.14 |
| 5,143,498 A | * | 9/1992 | Whitman ......................... 411/82 |
| 5,328,300 A | * | 7/1994 | Fischer et al. ............. 405/259.6 |
| 5,360,302 A | * | 11/1994 | MacMartin ...................... 411/23 |
| 6,468,010 B2 | * | 10/2002 | Sager et al. ...................... 411/82 |
| 6,902,366 B2 | * | 6/2005 | Ducker et al. ............... 411/82.1 |
| 2004/0033120 A1 | * | 2/2004 | Ducker et al. ............... 411/82.1 |

FOREIGN PATENT DOCUMENTS

| | | |
|---|---|---|
| DE | 26 39 533 A1 | 6/1977 |
| DE | 27 55 356 | 6/1978 |
| DE | 35 45 849 A1 | 7/1987 |
| FR | 2 335 786 | 7/1977 |

OTHER PUBLICATIONS

International Search Report dated Jul. 11, 2006 (with English translation of category of cited documents).
European Search Report (with English language translation of category of cited documents) dated Nov. 5, 2007.

* cited by examiner

*Primary Examiner* — Mickey Yu
*Assistant Examiner* — Niki Eloshway
(74) *Attorney, Agent, or Firm* — Buchanan Ingersoll & Rooney PC

(57) ABSTRACT

The invention relates to a pressure vessel for a machine, especially a turbomachine, which comprises at least 3 casing shell sections, wherein the intersection region of the parting joints is sealed off by a plug which in its interior has a system of holes and passages through which a sealing compound is pressed into the region between plug and casing shell sections, so that after its setting, an elastic, leakproof and non-destructively disassemblable sealing of the intersection region of the parting joints is created. The plug can be fastened on the casing shell sections by means of an integrated flange.

10 Claims, 3 Drawing Sheets

CROSS FLANGE SEAL FOR A PRESSURE VESSEL, ESPECIALLY FOR A TURBOMACHINE CASING

TECHNICAL FIELD

The invention relates to a pressure casing for a machine, especially for a turbomachine, which casing comprises a plurality of casing shell sections which are interconnected in a gastight manner.

BACKGROUND OF THE INVENTION

In such a pressure casing, the casing shell sections have contact faces, which customarily are pressed against each other by means of a respective threaded connection outside the sealing zone, so that so-called parting joints are created between adjacent casing shell sections.

If three or more casing shell sections are to be interconnected at the same time, as exemplarily shown in FIG. 1 with four casing shell sections, then the intersection region of the parting joints, the so-called cross joints, cannot be reliably sealed without additional measures. At the contact point of the three or more adjoining casing shell sections, small disturbances in the required geometry, as, for example, they arise as a result of damage to the flange edges during assembly of the mostly heavy casing shell sections, are practically unavoidable, which, with the high pressures which occur inside a turbomachine, inevitably leads to leaks.

The prior art recognizes a plurality of solution proposals for sealing a cross flange with four casing shell sections which adjoin each other. The documents DE 27 55 356 or CH 625 025, as the case may be, disclose known solution proposals, according to which the parting joints of a pressure vessel, which extend in a cross-form manner, are sealed by means of a bolt in the intersection region of the parting joints. Welding of the abutting ends of the casing shell sections, as already known, is also described.

The use of a cover flange, which by means of a seal is sealed on a seating face which is incorporated in the casing shell sections, is described as new in the mentioned document.

All these known solution proposals, however, have disadvantages which counteract a reliable, maintenance-friendly, i.e. easily disassemblable and reassemblable, sealing of the cross flange:

1. The sealing of a cross flange by means of a bolt does not meet the requirement for a reliable, maintenance-friendly seal:
   The bolt has to be replaced during overhauls of the turbomachine, depending upon how far wear and corrosion have impaired its durability.
   Since bolt and bolt seat as a rule are damaged when fitting and removing the bolt, a reworking, i.e. a reboring of the bolt seat, is necessary. At the same time, a new, larger bolt is required.
   During thermal distortions of the casing, the seal by means of a bolt is prone to leaks, since the bolt has practically no elastic deformation in order to compensate distortions of the casing.
2. The sealing of a cross flange by welding:
   Welding of the casing shell sections in the intersection region of the parting joints is indeed possible, however the taking apart of the casing becomes more difficult and overhauling of the turbomachine becomes more difficult as a result. Furthermore, reworking of the casing shell sections and their rewelding is necessary.
3. Sealing by means of a flange in the intersection region of the parting joints:
   It is disadvantageous in this form of sealing that the seating face on the casing shell sections is susceptible to scratches and impact points, as they can easily arise during assembly of the mostly heavy casing shell sections. During thermal distortions or a displacement of the casing shell sections in a direction perpendicular to the flange plane, the sealing integrity is no longer ensured, so that the sealing face has to be reworked.

SUMMARY

The invention starts at this point. The invention, as it is characterized in the claims, deals with the problem of providing a reliable, non-destructively detachable seal for the intersection region of three or more parting joints for a casing of the type described in the introduction, in which the disadvantages of the known seals are avoided and, by constructionally simple measures, leaks are prevented during all operating conditions.

This problem is solved according to the invention by the subject of the independent claim. Advantageous embodiments are the subject of the dependent claims.

The invention is based on the general idea that a seat for a plug is provided on the outer faces of the casing shell sections in the intersection region of the parting joints, and that the plug is detachably fastened in this seat and is sealed in the plug seat by means of a permanently elastic, high pressure-resistant sealing compound.

Such a sealing of cross joints, which is formed according to the invention, is especially suitable for sealing steam turbine casings.

The invention is basically applicable for sealing the intersection region of three or more parting joints of a pressure casing, wherein both an overpressure and a vacuum can prevail in the interior of the casing.

An important advantage of the invention is now that the sealing plug is embedded in a quasi-floating manner in an elastic sealing compound under an overpressure. As a result of this, thermal distortions of the casing shell sections can be compensated without the sealing integrity being impaired. This is achieved by the sealing compound in its liquid, not yet set, state, being poured into the plug and then, by means of a pressure screw, being guided through suitable passages inside the plug to the actual sealing chambers. These sealing chambers, for example, are formed as annular grooves in the outer wall of the plug, and are preferably interconnected so that when pouring the sealing compound into the plug, all regions of the sealing chambers are exposed to through-flow one after the other and therefore no cavities are created in the sealing compound. This is also boosted due to the fact that the displaced air and a surplus amount of the sealing compound can escape from the plug through a vent hole from the sealing chamber which is last exposed to through-flow. By means of a suitable closure, like, for example, a threaded bolt, the vent hole can be sealed off and some of the sealing compound displaced back into the inside of the plug, wherein an overpressure is created in the sealing compound which presses the sealing compound into the sealing chambers against the plug seat and therefore creates a solid, elastic seal after hardening of the sealing compound.

The pressing action of the seal can be advantageously further augmented during operation of the turbomachine by a sealing compound being used which has a higher thermal volumetric expansion (beta coefficient in m3/m3K) than the material of the pressure vessel.

For securing the plug against a possible slipping out from its seat, the plug, by means of a plug flange which is preferably formed as an integral part of the plug, can be fastened on the casing shell sections, for example by means of screws. In this case, it is advantageous that the plug flange has no sealing function and therefore damage or thermal distortions of the flange seat on the casing shell sections do not impair the sealing function of the plug. To the person skilled in the art, however, other methods of fastening are also known, like, for example, caulking of the plug in its seat by means of a spring expanding ring or other mechanical locking devices.

A further advantage of the sealing of cross joints according to the invention is that, for maintenance or overhauling of the affected machine, the plug can be non-destructively removed and, after corresponding cleaning of plug and plug seat, the same plug can be reused without mechanical reworking being necessary on plug seat or plug. For this purpose, preferably 2 adjacent casing shell sections are opened, as a result of which the plug becomes accessible from the side and can be removed perpendicularly to its axis. With a suitable solvent for the sealing compound, the latter can be removed, free of residue, from the plug and from the plug seat on the casing shell sections, so that the plug can be used anew for sealing according to the invention by means of sealing compound.

Further important features and advantages of the seal according to the invention result from the dependent claims, from the drawings, and from the associated figure description, with reference to the drawings.

BRIEF DESCRIPTION OF THE DRAWINGS

Preferred exemplary embodiments of the invention are shown in the drawings, and are explained in detail in the following description, wherein all like designations refer to the same components.

In the drawing.

DETAILED DESCRIPTION

Figure 1:
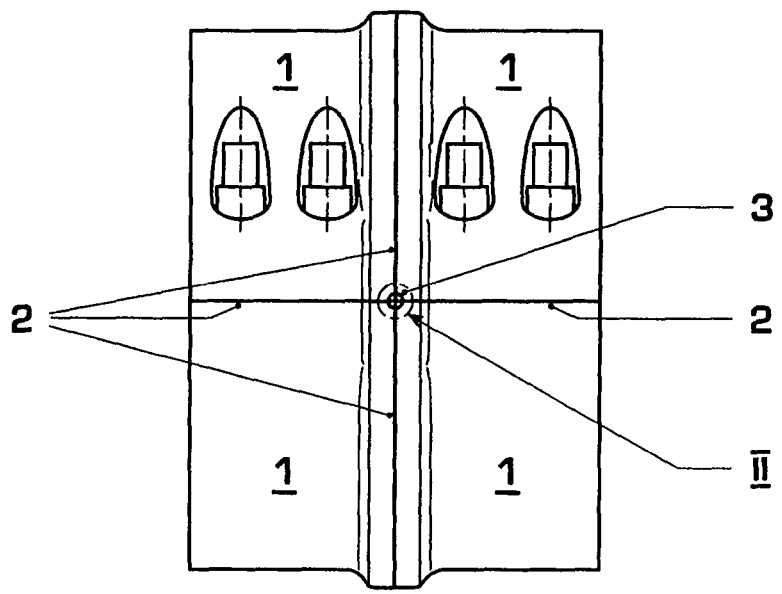
FIG. 1 shows a cross flange of a pressure vessel which comprises 4 adjoining casing shell sections with their parting joints
Figure 2:
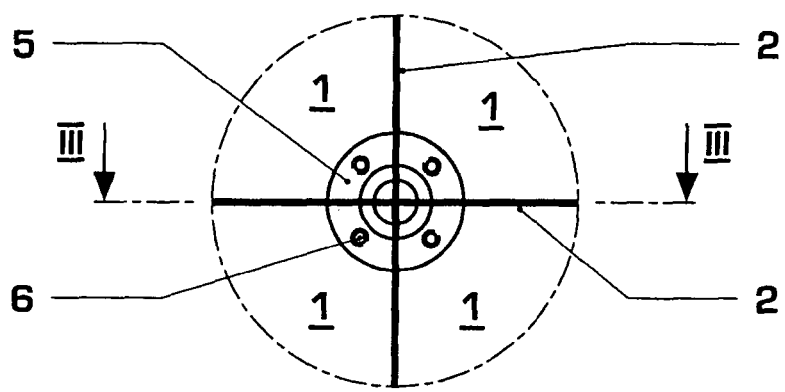
FIG. 2 shows detail A from FIG. 1: parting joint intersection region with seat for plug flange
Figure 3:
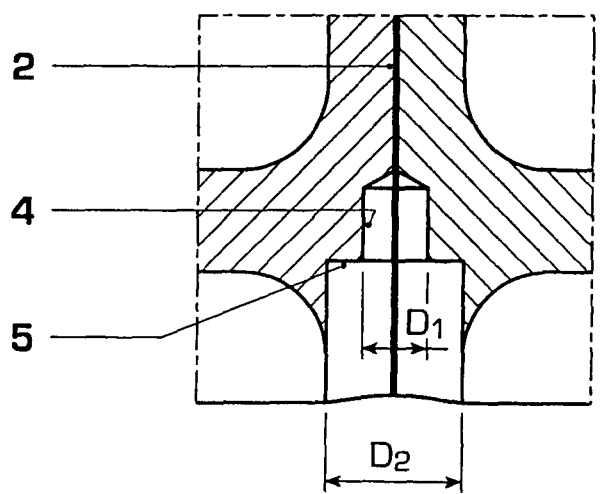
FIG. 3 shows section III-III from FIG. 2: plug seat in casing shell sections

The pressure casing according to the invention, which is partially shown in FIGS. 1 to 3, exemplarily comprises four casing shell sections (1), which are preferably screwed together in a gastight manner along their parting joints (2). Since in a turbomachine, like, for example, a gas turbine, steam turbine, supercharger or compressor, the inner space generally has a high overpressure in relation to the outer space, the intersection region (3) of the parting joints (2) cannot be reliably sealed without additional measures. In order to reliably prevent the escape of steam from the intersection region (3) of the parting joints (2), the intersection region (3) of the parting joints (2) is sealed by means of an inserted plug (7). This plug (7), as shown in FIGS. 4 to 11, has a system of holes (10, 11, 12, 15) and passages (13, 14) in its interior, through which a permanently elastic sealing compound (19) is pressed into the interspace between plug (7) and casing shell sections (1).

In FIG. 2, the intersection region (3) of the parting joints (2) is shown enlarged as a detail II from FIG. 1. It is evident that in the center of the intersection region (3) of the parting joints (2) a plug seat (4) for the plug (7) is machined out from the casing shell sections (1). A flange seat (5), with threaded holes (6) as counterpart for the plug flange (8), is also provided on the casing shell sections (2). Since the flange seat (5) serves purely for fastening of the plug (7) and not, as in the quoted prior art (document CH 625 025), as a sealing face, no high requirements are made for the surface quality of the flange seat (5). FIG. 3 shows in a section III-III from FIG. 2 the flange seat (5), and also an exemplary form of the plug seat (4) which is incorporated in the casing shell sections (1) and in alignment with a parting joint (2).

Figure 5:
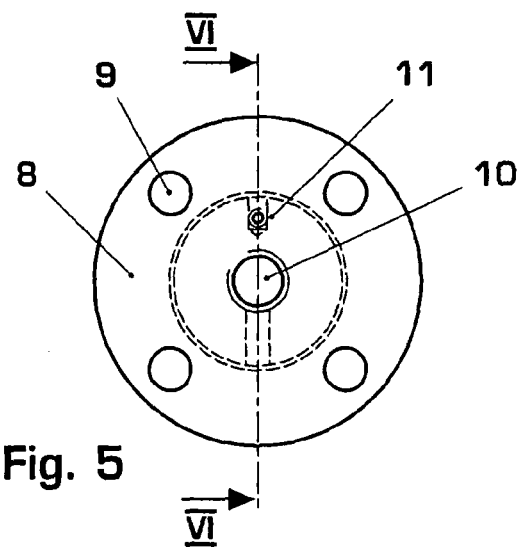
FIG. 5 shows a plan view of the plug flange with filling hole and vent outlet hole for the sealing compound
Figure 6:
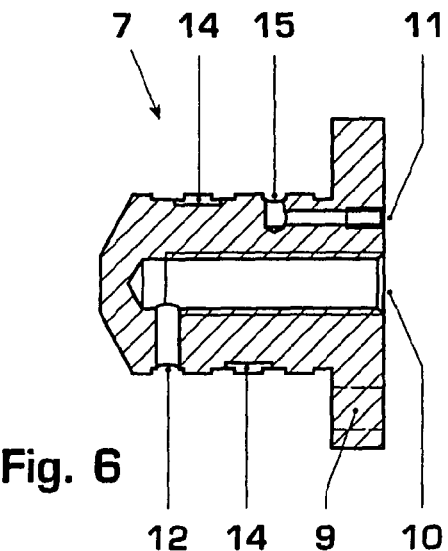
FIG. 6 shows section VI-VI from FIG. 5: plug with inlet and outlet hole for the sealing compound, and also vent inlet hole and vent outlet hole
Figure 4:
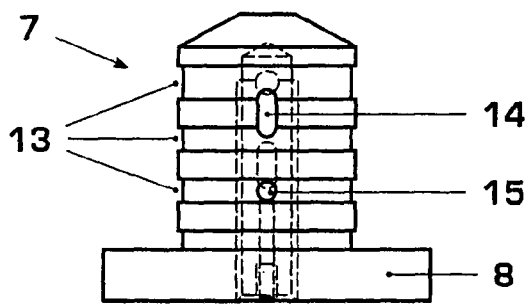
FIG. 4 shows a side view of the plug with outlet hole for the sealing compound and connecting passage of two sealing chambers
Figure 7:
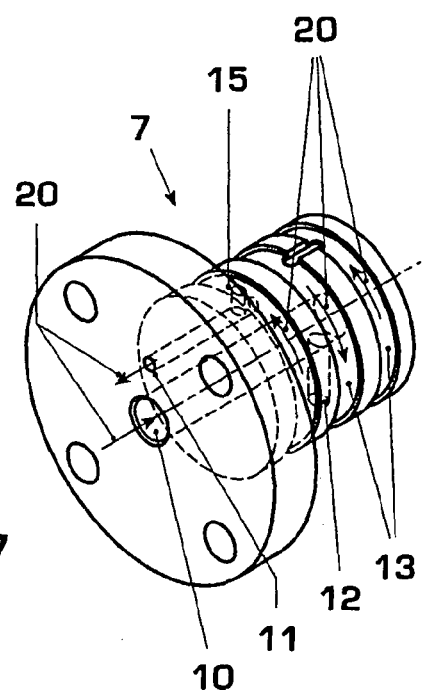
FIG. 7 shows a perspective view of the plug. The flow directions of the sealing compound are indicated by arrows

FIGS. 4 to 6 show different views and sections of a preferred embodiment of the plug (7) according to the invention, with its holes (10, 11, 12, 15) and passages (13, 14) for introducing and distributing the liquid sealing compound (19). FIG. 7 shows a semi-transparent perspective view of the plug (7). The flow direction (20) of the sealing compound (19) is indicated in each case by arrows. The rear section of the plug (7) is formed as an integrated plug flange (8) and has fastening holes (9) for fixing the plug (7) on the casing shell sections (1). The filling hole (10) for the sealing compound (19) is located in the center of the plug flange (8), which filling hole (10) extends in the axis of the plug (7) until it meets the outlet hole (12) which extends radially to the axis of the plug (7). On the periphery of the plug (7), this outlet hole (12) leads into a first sealing chamber (13) which is cut in an annular fashion into the outer circumference of the plug (7). A preferred embodiment of the plug (7) according to the invention has three annular sealing chambers (13) in series in the axial direction, wherein the third sealing chamber (13) lies nearest to the plug flange (8). In order to guide the liquid sealing compound (19) without interruption through all three sealing chambers (13), the first and second sealing chamber (13), and also the second and third sealing chamber (13), are interconnected in each case by a connecting passage (14). In this case, the connecting passage (14) between the second and third sealing chamber (13) is sunk into the outer wall of the plug (7) on the side of the outlet hole (12). The connecting passage (14) between the second and third sealing chamber (13) is cut into the rear side of the plug (7) for this. The vent inlet hole (15) in the third annular sealing chamber (13), which inlet hole extends radially in the direction of the axis of the plug (7), is also located on this side of the plug (7). This vent inlet hole (15) is connected inside the plug (7) to the vent outlet hole (11) which extends from the plug flange (8) parallel to the filling hole (10).

The perspective drawing in FIG. 7, with reference to the arrows, schematically shows the flow direction (20) of the sealing compound (19) through the plug (7).

Figure 8:
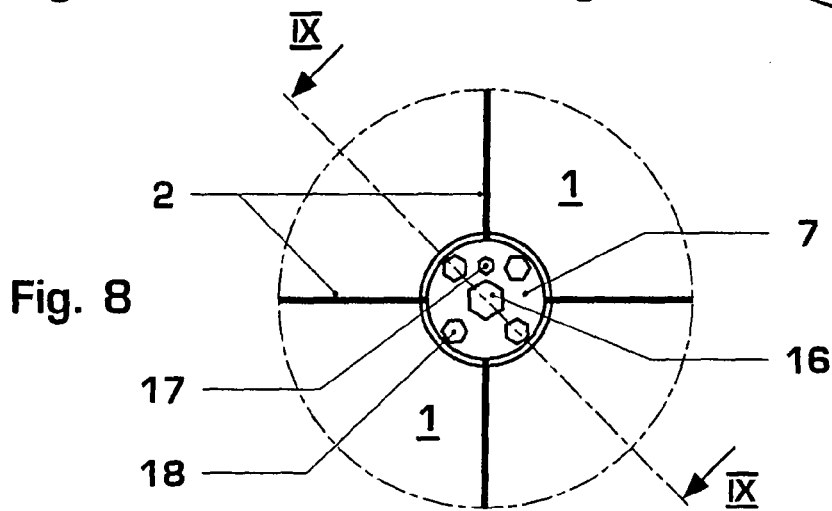
FIG. 8 shows parting joint intersection region with plug inserted

The intersection region (3) of the parting joints (2), with a plug (7) inserted, is shown in FIG. 8. The heads of the pressure screw (16), of the sealing screw (17), and also of the flange screws (18), are to be seen on the plug flange (8).

Figure 9:
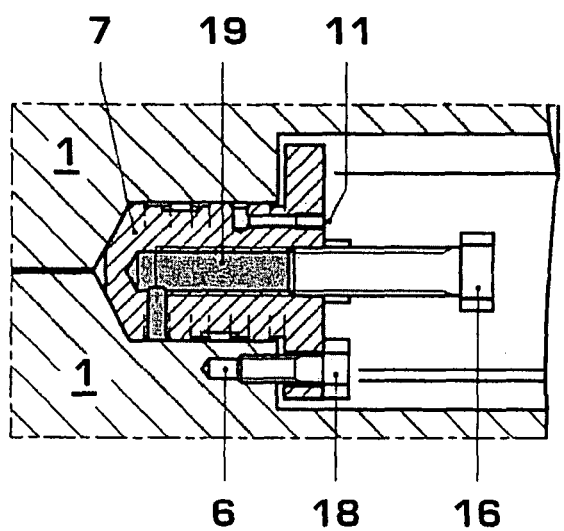
FIG. 9 shows section IX-IX from FIG. 8: plug with pressure screw before pressing in of sealing compound FIG. 10 as FIG. 9, but after pressing in of the sealing compound. The flow directions of the sealing compound are indicated by arrows FIG. 11 as FIG. 10, but after inserting the sealing screw
Figure 10:
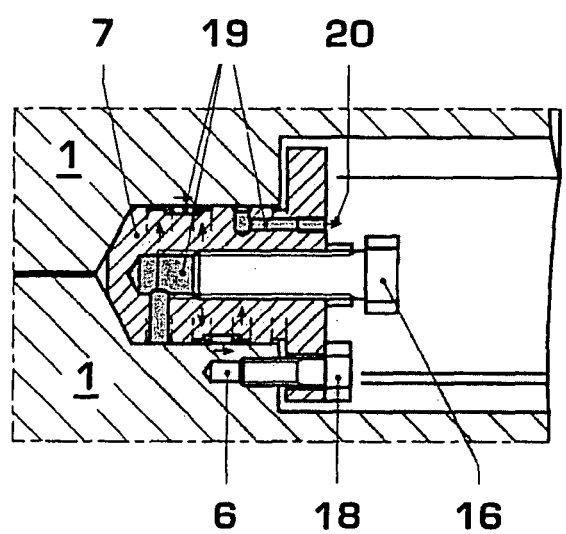
Figure 11:
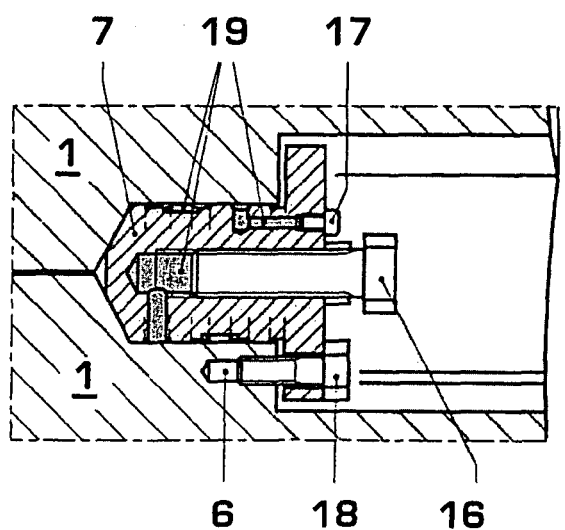

FIGS. 9 to 11 show different stages of the pressing in of the sealing compound (19) into or through the plug (7), as the case may be, and also the pressure build-up in the sealing compound (19) by means of the sealing screw (17):

After pouring the liquid sealing compound (19) into the plug (7), the pressure screw (16) is screwed into the filling hole (10) in the plug flange (8), and as a result the liquid sealing compound (19) is pressed into the plug (7) (FIG. 9). The sealing compound (19) by means of the outlet hole (12) enters the first sealing chamber (13), from where, after complete filling of this first sealing chamber (13), it reaches the second sealing chamber (13) by means of the first connecting passage (14), and, after complete filling of the second sealing chamber (13) as well, finally reaches the third sealing chamber (13) by means of the second connecting passage (14). The complete filling of the respective sealing chambers (13) is ensured by a special arrangement of the connecting passages (14) and holes (12, 15), in this case offset by 180°.

In FIG. 10, the flow direction (20) of the sealing compound (19) through the plug (7) is shown by arrows. For complete filling of all the holes (10, 11, 12, 15) and passages (13, 14) of the plug (7), the sealing compound (19) is pressed by means of the pressure screw (16) through the plug (7) until the air, which is displaced by the sealing compound (19), is completely discharged from the vent outlet hole (11) and a small amount of sealing compound (19) already escapes. After that, the vent outlet hole (11) is sealed off by a sealing screw (17), and by screwing this sealing screw (17) into the plug flange (8) an overpressure is built up in the sealing compound (19), so that the sealing compound (19) in the sealing chambers (13) reliably seals the plug (7) in relation to the casing shell sections (1).

After the setting of the liquid sealing compound (19), as a result of this a reliable, elastic and disassemblable sealing of an intersection region (3) of the parting joints (2) on a pressure vessel is achieved, which maintains its sealing action even during thermal distortions of the casing shell sections (1). Within the scope of overhauling a turbomachine, the plug (7) can be removed in a problem-free and non-destructive manner after opening the casing shell sections (1). After the cleaning of plug (7) and plug seat (4) in the casing shell sections (1) by means of suitable solvents, the plug (7) can be used again during the reassembly of the turbomachine without, as a rule, the plug seat (4) in the casing shell sections (1) having to be reworked.

The embodiments which are shown here are purely exemplary and therefore without limitation of the generality, in particular the principle according to the invention of the cross flange sealing can also be used on 3, 5 or more casing shell sections which are to be sealed at a common point.

LIST OF DESIGNATIONS

1 Casing shell section
2 Parting joint
3 Intersection region of 2
4 Plug seat
5 Flange seat
6 Threaded hole
7 Plug
8 Plug flange
9 Fastening hole
10 Filling hole
11 Vent outlet hole
12 Outlet hole
13 Sealing chamber
14 Connecting passage
15 Vent inlet hole
16 Pressure screw
17 Sealing screw
18 Flange screw
19 Sealing compound
20 Flow direction of 19

What is claimed is:

1. A seal for an intersection region of parting joints of a pressure vessel which includes at least three casing shell sections, the seal comprising:
a plug including at least two sealing chambers, for inserting in the intersection region of the parting joints;
a liquid, settable sealing compound poured into the at least two sealing chambers which are constructed on the plug as annular grooves formed on an outer circumference of the plug, each groove separated by a radial rib formed on the outer circumference of the plug, the sealing compound connected in a gastight manner to the casing shell sections;
a passage formed through the radial rib between adjacent annular grooves, the passage being formed on an outer circumference of the plug for guiding the liquid sealing compound through successive sealing chambers;
wherein the plug comprises:
a filling hole for the sealing compound,
a vent outlet hole for escape of surplus sealing compound and air which is displaced by the sealing compound,
a plug flange on a free end of the plug for being fastened on the casing shell sections, and
a vent inlet hole arranged in a sealing chamber of the plug, the vent inlet hole connected inside the plug to the vent outlet hole, wherein the vent outlet hole extends from the plug flange parallel to the filling hole.

2. The seal as claimed in claim 1, wherein the plug comprises a system of holes and passages, through which a sealing compound is directed to sealing regions of the plug.

3. The seal as claimed in claim 2, wherein
the plug, after cleaning of plug and plug seat, is reusable.

4. The seal as claimed in claim 1, comprising:
a pressure screw, wherein the filling hole being sealed off by means of the pressure screw for pressing in the sealing compound.

5. The seal as claimed in claim 3, wherein
the plug, after cleaning of plug and plug seat, is reusable.

6. The seal as claimed in claim 1, comprising:
a sealing screw for sealing off the vent outlet hole, and which, when screwing in, creates an overpressure in the sealing compound.

7. The seal as claimed in claim 1, wherein
the plug, after cleaning of plug and plug seat, is reusable.

8. The seal as claimed in claim 1, wherein
the sealing compound, after setting, is high pressure-resistant and elastic.

9. The seal as claimed in claim 8, wherein
the sealing compound has a higher thermal volumetric expansion (beta coefficient in m3/m3K) than the material of the pressure vessel.

10. The seal as claimed in claim 1, wherein
the plug is non-destructively removable.

* * * * *